United States Patent
Bösch

(10) Patent No.: US 7,341,237 B2
(45) Date of Patent: Mar. 11, 2008

(54) VALVE MECHANISM FOR A VACUUM VALVE

(76) Inventor: Hubert Bösch, Sandstr. 29, Lustenau (AT) A-6890

( * ) Notice: Subject to any disclaimer, the term of this patent is extended or adjusted under 35 U.S.C. 154(b) by 0 days.

(21) Appl. No.: 11/531,215

(22) Filed: Sep. 12, 2006

(65) Prior Publication Data

US 2007/0057220 A1    Mar. 15, 2007

(30) Foreign Application Priority Data

Sep. 12, 2005    (DE) .................. 10 2005 043 595

(51) Int. Cl.
*F16K 3/00*    (2006.01)
(52) U.S. Cl. .................. 251/167; 251/204; 251/279
(58) Field of Classification Search ............... 251/203, 251/204, 167, 193, 279
See application file for complete search history.

(56) References Cited

U.S. PATENT DOCUMENTS

| | | | | |
|---|---|---|---|---|
| 681,285 | A * | 8/1901 | Wehner et al. | 251/167 |
| 983,960 | A * | 2/1911 | Watson | 251/167 |
| 1,057,308 | A * | 3/1913 | Watson | 251/167 |
| 2,502,689 | A * | 4/1950 | Yant | 251/167 |
| 3,973,753 | A * | 8/1976 | Wheeler | 251/204 |
| 4,408,634 | A * | 10/1983 | Peacock | 251/167 |
| 4,480,659 | A * | 11/1984 | Peacock | 251/197 |
| 4,560,141 | A * | 12/1985 | Bosch | 251/167 |
| 4,718,637 | A * | 1/1988 | Contin | 251/158 |
| 4,846,441 | A * | 7/1989 | Scobie et al. | 251/307 |
| 4,903,937 | A * | 2/1990 | Jakubiec et al. | 251/167 |
| 5,722,636 | A * | 3/1998 | Houston | 251/167 |
| 5,743,296 | A * | 4/1998 | Bosch | 251/279 |
| 6,109,167 | A * | 8/2000 | Vertanen | 251/63.6 |
| 6,431,518 | B1 * | 8/2002 | Geiser | 251/193 |
| 6,474,622 | B2 * | 11/2002 | Ito | 251/204 |
| 6,896,239 | B1 * | 5/2005 | Brenes | 251/92 |

FOREIGN PATENT DOCUMENTS

| | | |
|---|---|---|
| EP | 0662575 B1 | 7/1995 |
| JP | 2001090849 A | 4/2001 |

* cited by examiner

*Primary Examiner*—John Bastianelli
(74) *Attorney, Agent, or Firm*—The Maxham Firm

(57) ABSTRACT

A valve mechanism having at least one movable valve member for sealing of a valve opening in a housing. Movements of the individual movable valve members are accomplished essentially parallelly to, and perpendicularly to, the seat surface of the valve during the opening and closing of the valve. In order to achieve high forces and low wear in the movement carried out with aid of a slot guide which guide serves to transmit forces during, and in the direction of, the opening and closing, the slot guide comprises slots which are formed in a drive plate, which slots cooperate with and overlap complementary slots in the movable valve members.

20 Claims, 6 Drawing Sheets

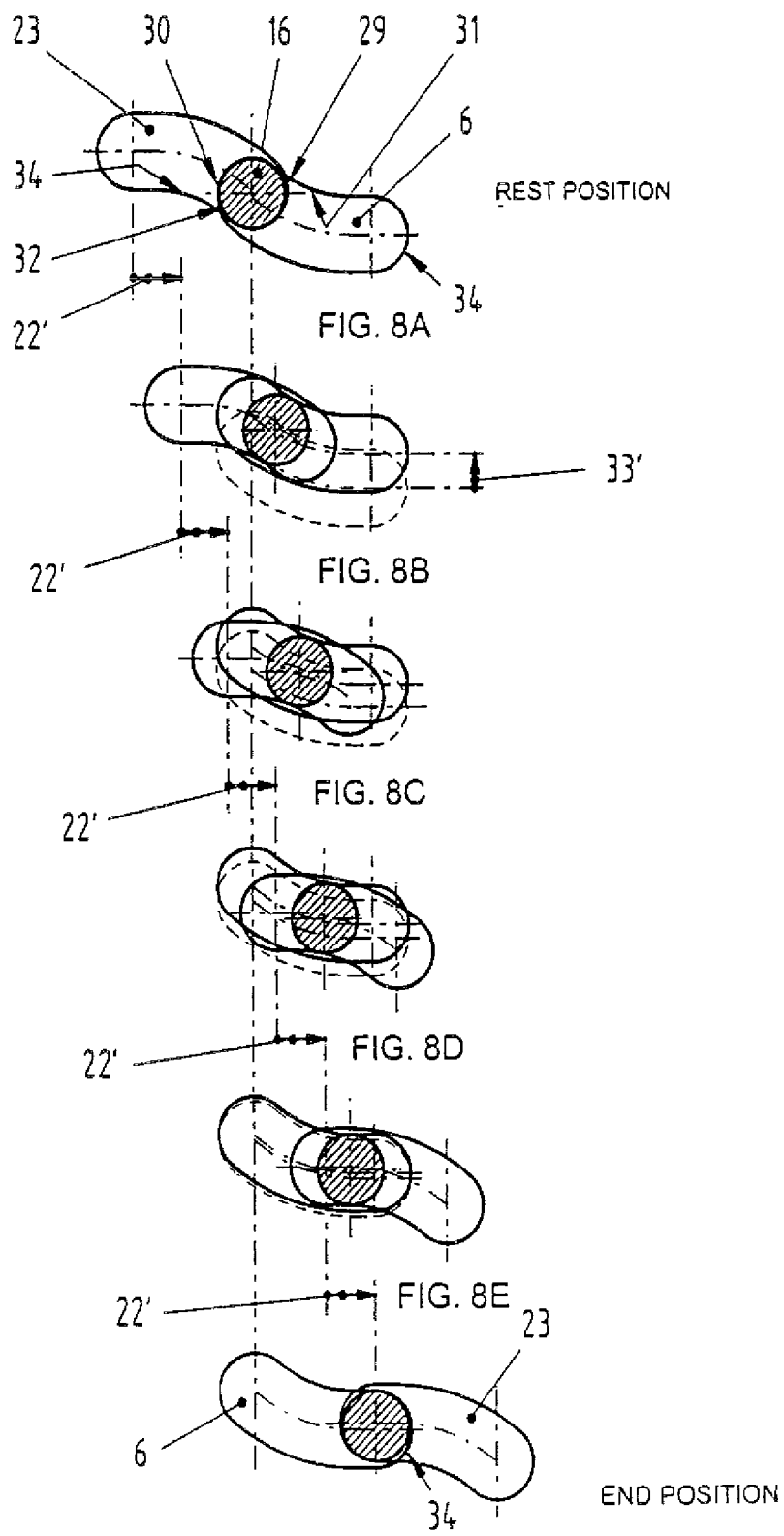

VALVE MECHANISM FOR A VACUUM VALVE

FIELD OF THE INVENTION

The invention relates to a valve mechanism for a vacuum valve, and more particularly to a mechanism to apply a high sealing pressure through the use of two mutually movable elements.

DISCUSSION OF PRIOR ART

Vacuum valves are preferred for closing of throughgoing openings in vacuum equipment. Valve mechanisms of the type described may also be used for other valves in which forced guidance is advantageous, for example, shutoff elements in pipes or the like wherein liquids are transported.

A known valve mechanism is disclosed by the present Applicant in EP 0662575 B1. According to that publication, a movable valve member is rolled on fixed mounted support shafts. The costs of realizing such a solution are high, and the support shafts disclosed cannot bear as much stress as free guided roll members guided in suitable guide means without bearings.

An example of bearing-free guided shafts, referred to hereinbelow as "roll bodies" in roll or cylindrical roller form, is disclosed in JP 2001-090849 A1. In this known valve mechanism, three circular plates which are mutually translatably movable are provided, and between them free guided spheres are disposed which spheres serve as roll bodies. Upwardly inclined grooves are distributed over the periphery of a first plate which is rotationally driven, and the spheres are translationally guidably disposed in the grooves. These spheres engage corresponding, opposite, grooves of a second, middle plate. On the opposite side of said middle plate, additional grooves are provided wherein spheres arc translatably guided which spheres engage corresponding grooves in a third plate. This third plate is the valve plate (movable valve member) which, depending on the rotational position of the other two plates, is moved against the throughgoing opening in the housing or is moved away from that opening.

These guide means have major drawbacks. They have an open structure, such that the spheres can fall out any time the accommodating plates are not adequately pressed together, for example, on the occasion of a disturbance, vibration, impact, malfunction, spring breakage, or the like. This problem will occur if the plates cease to be pressed together for even a very short period of time, sufficient for the weight of the spheres to allow them to fall out of their designated grooves and positions.

Ordinarily, quite large forces are employed for closing such valves, in order to achieve sufficient pressing of the seal against the valve seat. Whereas a pressure difference across the valve can act on the movable valve member in such a way as to add to the achievable sealing forces, it is also true that that such a pressure difference can act in the opposite sense, to hold the movable valve member closed. Thus the system overall will be useless. Valve components become disengaged, the movable valve member tends to break, and substantial damage can result.

The above-cited EP 0662575 B1 discloses guides with closed grooves, but bolts travel in the grooves which are supported on only one side. Because of space considerations, these support means must be kept relatively small, so that they are operating close to their stress tolerance limits.

SUMMARY OF THE INVENTION

A feature of the invention is that only as few as two pieces are provided which are translationally movable with respect to each other, one such piece being the drive plate and the other being the movable valve member. At least one slot is formed in the drive plate which slot cooperates with and overlaps a complementary slot in the neighboring movable valve member. A roll body, having a cylindrical or drum or roller shape is disposed in the overlap region between the drive plate slot and the complementary (valve member) slot.

This structure affords the important advantage that for the first time it is possible, with the use of two mutually movable pieces, to admit a high pressing force for sealing purposes, and with the same force to bring about opening of the valve, without the risk that the roll body becomes undesirably displaced in its accommodating structure or becomes completely lost.

Another advantage of the present invention is that the cooperating slots in the one piece and the neighboring piece are both closed, so that the roll bodies are secured against undesirable displacement (or dislodgment) upward or downward or otherwise. The closed slots limit engagement of the roll bodies to the axial longitudinal direction.

The roll bodies disclosed here are not self-supported bearings, such as ball bearings with inner and outer races, but are free guided roll bodies without the use of additional mechanical elements. Accordingly, for a given external diameter they have appreciably higher load bearing capability. This leads to the advantage that a closed slot in accordance with the invention has equal force transmission capability and equal force sustaining capability, in both the closing and the opening operations. This enables the invention to have very high sealing forces and very high releasing forces. Such releasing forces may also be required if, after a very long period of being closed, the seal, which generally will be an elastomeric seal, has developed substantial adhesion forces which must be overcome in the opening operation.

A particular advantage of the invention is that in the simplest case no tensile return springs are needed, because the roll bodies are completely forced and guided, and enclosed, in associated accommodating configurations between the slots, and are forcibly guided in the valve-sealing direction and in the opposite direction.

The embodiments of the invention are not limited to a configuration in which the roll bodies are in the form of rolls or the like extending entirely from one side of the device to the other. According to another embodiment of the invention it may be provided that the roll bodies are only present in the form of segments of rolls or the like and, for example, do not extend over the entire width of the valve from one side of the valve to the other, and are not interconnected by a connecting member.

The embodiments of the invention are not limited to the use of roll bodies in the form of cylindrical rolls. Other shapes may be employed, such as, in particular, triangular bodies which enable direct rolling movement with rounded spherical surfaces.

Because the forces on the roll bodies are substantially smaller than the forces employed previously in related valve structures, it is sufficient for the roll bodies to be comprised of a commercially widely available and relatively inexpensive metallic material. Similarly, it is unnecessary for the guide slots for the roll bodies to have specially hardened support surfaces.

As a supporting element for the slots according to the invention, preferably a carriage is employed which is driven in the horizontal direction. Suitable drive means are known in the art and are not specifically described herein.

It is not essential to the embodiments of the invention that the carriage have four supporting wheels. Other types of support elements may be utilized, such as convex roller bearings or the like.

The term "carriage" is referred to herein as the "drive plate," because it is in the form of a plate-shaped body borne by rollers which body is driven in translational movement on a support surface in a housing.

In this connection the movable valve member borne by the carriage is longitudinally guided by a guide slot (guideway) which at its end forces the movable valve member to move upward toward the sealing seat. Instead of such a guideway for the movable valve member, other means of forcing and guiding mechanisms for lifting may be used such as, for example, a rocker arm or the like.

BRIEF DESCRIPTION OF THE DRAWING

The objects, advantages, and features of the invention will be more clearly perceived from the following detailed description, when read in conjunction with the accompanying drawing, wherein:

FIGS. 8A-8F show the course of movement when complementary slots in accordance with the invention are moved with respect to each other;

DETAILED DESCRIPTION OF THE PREFERRED EMBODIMENTS

Figure 1:
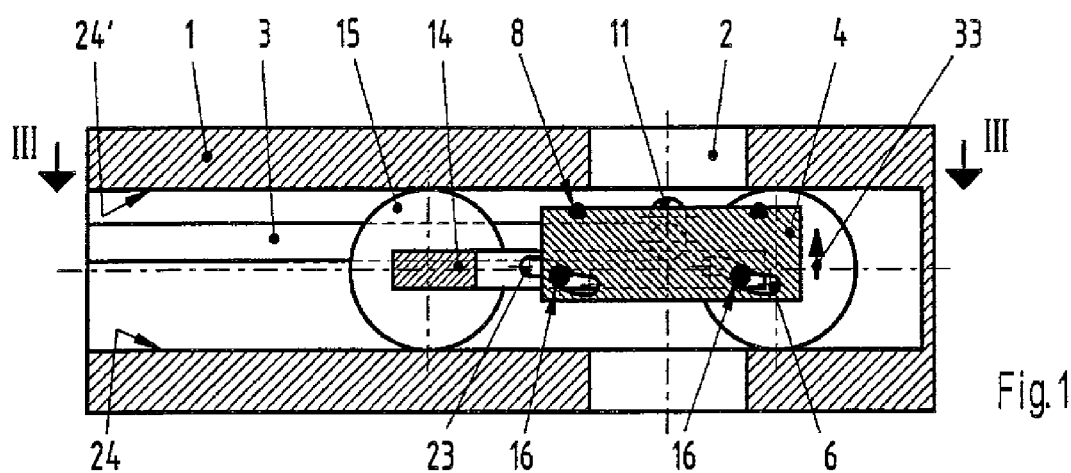
FIG. 1 is a cross section through a first embodiment of the invention of a valve mechanism in a vacuum valve.

FIG. 1 is a general view of a valve mechanism of the invention in a vacuum valve, wherewith throughgoing valve opening 2 is disposed in housing 1. The valve opening can be closed off by movable valve member 4 with the aid of sealing element 8.

Figure 2:
FIG. 2 is a plan view of the guideway slot in the FIG. 1 embodiment for forcible guiding of the movable valve member.
Figure 3:
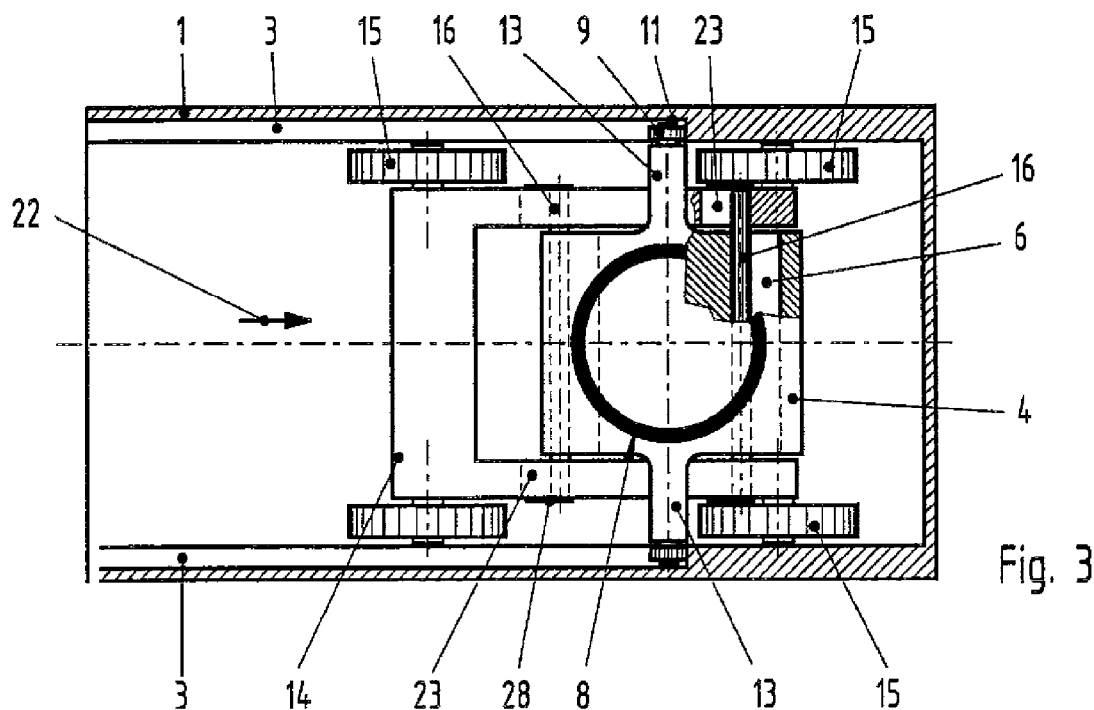
FIG. 3 is a cross section through line III-III of FIG. 1.
Figure 6:
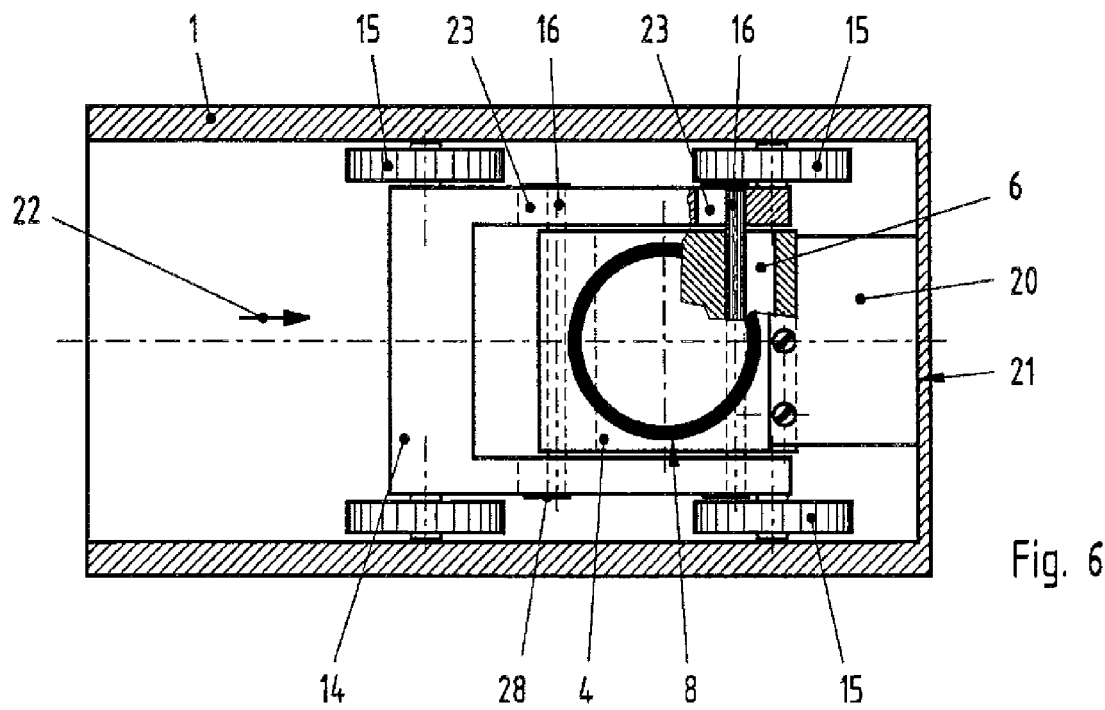
FIG. 6 is a cross section through line VI-VI of FIG. 5.

The traveling element (carriage) illustrated in FIGS. 1 and 3 is essentially comprised of drive plate 14 which is drivable back and forth in the direction of arrow 22 (see also FIG. 6);

The excursion of movable valve member 4 is effected with the aid of guideway slot 3 which is bent at its end, as shown in FIGS. 1-3, which slot 3 is formed in the two sides of the housing 1. Guideway slot 3 is engaged on both sides by rollable suspension means (wheel or roller) 9.

Guideway slot 3 and its function are illustrated more clearly in FIG. 2. Wheel 9 moves exclusively along axis 10, which axis has at its front end a part 11 which extends perpendicularly to its main direction. Between the two parts a gradual transition or radius 12 is provided to ensure a smooth transition of the movement. It is understood that a small amount of air reaches this wheel traveling in the guideway slot, to enable the bearing to roll on the running surface of the guideway slot. The wheel is connected to the movable valve member 4 via the arm 13 which is integral to or fixed to said valve member 4.

Wheel 9 has exclusively guiding functions, and in particular is not subjected to stresses of the sealing or release of the valve closure. It bears only the weight of the parts suspended on it, such as movable valve member 4.

Drive plate 14 has a plurality of suspension means 15 which are movable in the drive plane along the axis or in direction of arrow 22 but are not movable along any other axis. In the embodiment shown, the suspension means are wheels 15 which roll on corresponding support surfaces 24 disposed in the interior of the housing. The actual support surface for wheels 15 is either the lower support surface 24 or the opposite support surface 24', depending on the installed orientation of the overall housing 1.

In order to bring about the rise of the valve member 4 in the direction of arrow 33 in FIG. 1 toward the sealing seat, forceful guide elements are provided in the form of roll bodies 16. Roll bodies 16 are in the form of throughgoing profiled rolls, shafts, or pins (see FIG. 3). The outer end of each roll body 16 engages a corresponding control slot 23 in the region of the drive plate 14. In this way, a form-interlocking (configurationally engaging) connection between the two slots (6, 23) is provided, via the respective engaging gudgeon ends of the roll bodies 16.

It was mentioned in the Summary hereinabove that it is not critical to the invention that the roll body 16 extend over the entire width of the valve member. The support member embodied as the roll body 16 may be comprised of two aligned roll bodies which are not joined. Thus, roll body 16 may have a break in its center, to form two roll body parts which are held in alignment in movable valve member 4. Such a configuration with divided roll bodies 16 is particularly preferred for vacuum valves of large operating width.

The shapes of the slots 6 and 7 (FIG. 5) are preferably arcuate curves. However, other shapes may be chosen, such as:

inclined straight lines at a constant angle;
straight lines with two angles (a reverse bend) and an arcuate transition between them; or
a configuration with a straight inclined region in the region of high force, and possibly with a small indentation at each end position for catching the end position.

FIGS. 7A-7E show examples of various slot shapes meeting this description, The slots are surrounded by walls which limit movement in the direction perpendicular to their longitudinal extent. Such limiting is also present on the ends of the slots (the upper and lower ends). Thus a roll body can enter into engagement with a control slot only in a plane perpendicular to the plane of the longitudinal extent of the control slot.

It may be seen from FIGS. 7A-7E that the coordinated complementary slots 6 and 23 have overlapping end regions. In particular, it may be seen from FIGS. 8A-8F that the control slot 23 in drive plate 14 has an end region 29 which forms one side of an accommodating opening 32, whereas the other side of the accommodating opening 32 is formed by the end region 30 of the complementarily disposed slot 6 in the movable valve member 4. In this way, a complete accommodating opening 32 which surrounds roll body 16 is formed, in which opening 32 the roll body is held without appreciable play.

Figure 7A:
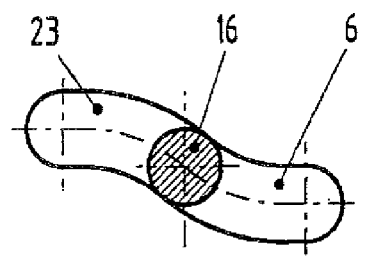
FIGS. 7A-7E show several exemplary embodiments of the complementary slots in accordance with the invention.
Figure 7B:
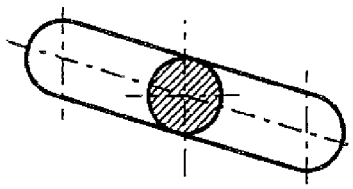
Figure 7C:
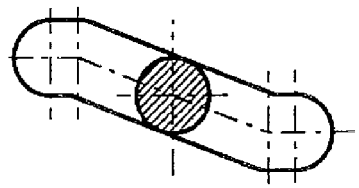
Figure 7D:
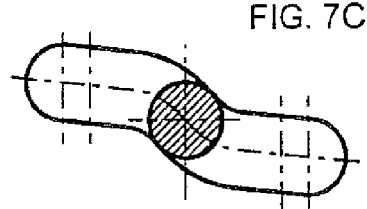
Figure 7E:
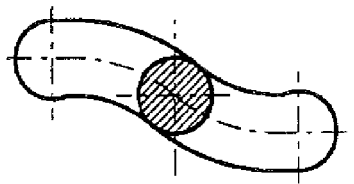

The various slot embodiments illustrated in FIGS. 7A-7E demonstrate that the shape of the slots is not confined to simple arcuate curves but may have angular bends, or slots 6 and 23 may be substantially comprised of respective straight inclined regions (FIG. 7B). Thus it is possible to provide a constant deflection over the extent of the slot. In any event, it is important that slots 23 on both sides of drive plate 14 have the same shape (but rotated 180° to result in a complementary shape).

If the slots had different slot shapes, this would be attended by different characteristics of the rolling contact and rolling wear which, while tolerable, would not be desirable, because then the frictional angles between roll body 16 and its support surface 34 would cause a certain amount of play whereas, in contrast, with geometrically congruent but oppositely disposed slots 6 and 23, the traveling contact points on support surfaces 31 and 34 will be fundamentally diametrically oppositely disposed on the outer circumference of roll body 16. Thus the roll body will essentially continuously move exactly between two parallel surfaces, even when the paths of these surfaces are curved. This will provide optimal stress transmission between the roll bodies and the associated contact points, in the region of support surfaces 31, 34.

For the exemplary embodiments of FIGS. 8A-8F, illustrating the contact points during the opening of the valve, the analogous considerations apply to those which apply for the valve-closing process, except that the contact points on the respective support surfaces 31 and 34 are reversed.

As described above in connection with FIG. 3, the two parallel roll bodies 16 disposed a distance apart are positioned in parallel slots 6 disposed a distance apart in movable valve member 4.

According to a refinement of the invention, it is provided that the movement of the parallel roll bodies 16 disposed a distance apart is synchronized. For this purpose, synchronization plate 36 (FIG. 10) is employed which is shown disposed on one side of movable valve member 4 in the intermediate space between the outer side surface of the movable valve member and the opposing surface of drive plate 14. As seen in FIG. 3, a gap is provided there (gap 35 in FIGS. 9 and 10), in which gap the synchronization plate 36 is disposed with some space to spare, allowing plate 36 to operate with some play. Only one such gap 35 and plate 36 is shown, but it is preferable that there be a plate 36 on each side valve member 4. The end of each roll body 16 extends through and engages a synchronization plate 36, so that the synchronization plate accommodates and guides the ends of the roll bodies on both sides of movable valve member 4. This achieves absolute parallel guiding of the two roll bodies 16 on each side of the movable valve member 4.

Figure 5:
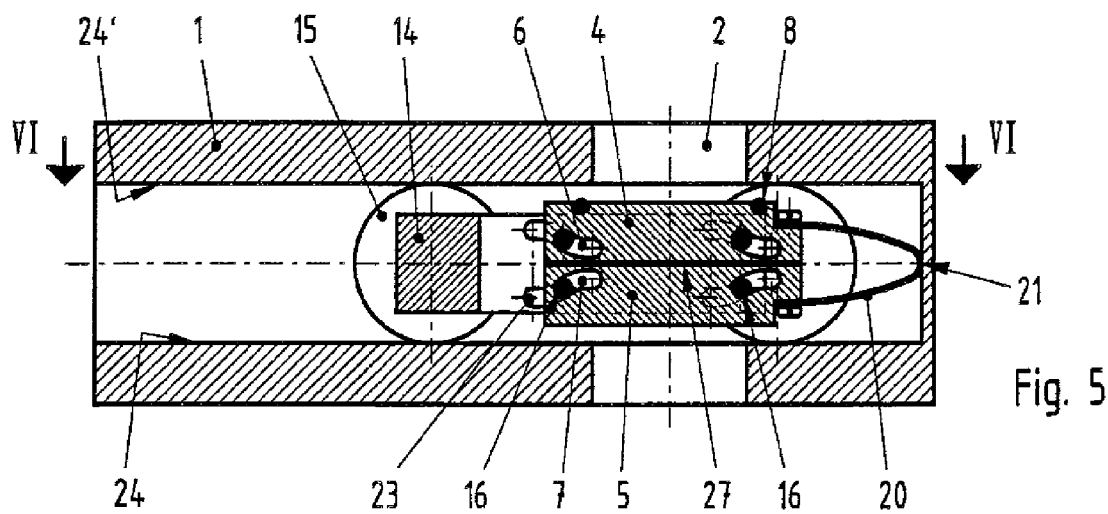
FIG. 5 is a cross section through a second exemplary embodiment of the valve mechanism of the invention, with a movable valve member and a counter-disc.

This synchronization means, employing synchronization plates, applies analogously for the embodiment according to FIG. 5, which (as shown) has twice as many roll bodies. Also for this case, it is provided that the laterally disposed roll bodies extend through and engage the synchronization plate on the front and rear sides, so that here, in the embodiment shown, the front and rear roll bodies are moved in continuous synchrony, via the synchronization plate(s) disposed between said roll bodies.

Figure 4:
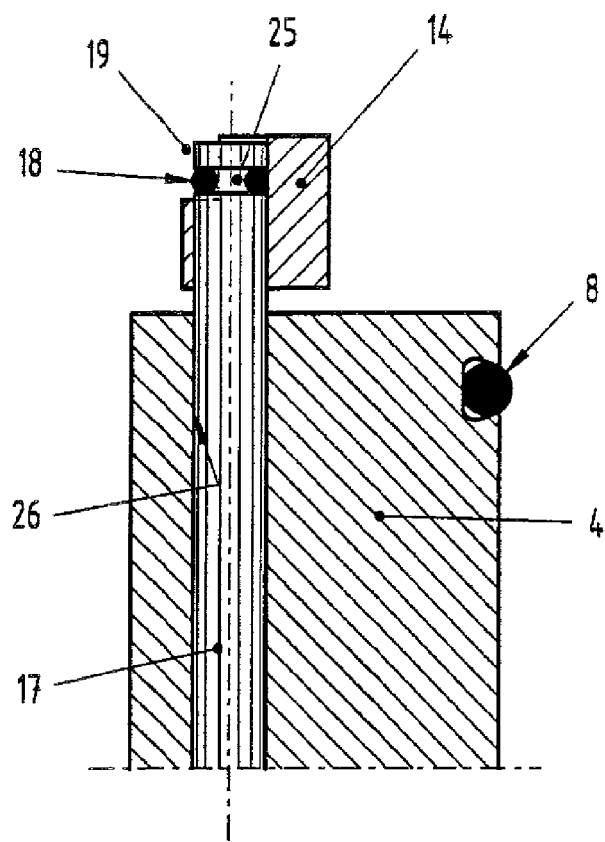
FIG. 4 is an enlarged cross sectional view through a detail of the guide means for the roll body in the slot of FIG. 1.

FIG. 4 illustrates another embodiment of the above-described roll body. This roll body 17 may have a groove 25 at one or more locations which groove receives a spring-loading element, such as O-ring 18. At the corresponding location on drive plate 14, recess 19 is provided, the resulting configuration being that O-ring 18 is pressed (lightly) on only one side, namely, that of the support surface 26.

Such a mechanism ensures that that roll body 17 is always urged in one lateral direction, even in the presence of tolerances which may be necessary for manufacturing engineering reasons and which cause a slight play. The arrangement with the O-ring according to FIG. 4 may optionally (but not necessarily) be provided in the embodiment according to FIGS. 5 and 6. Spring element 20 is provided in that embodiment which, when slightly pre-stressed, urges roll bodies 16 against the corresponding surfaces in slots 6 and 7.

Also in FIGS. 5 and 6 spring element 20 is employed as a detent means 21 for the forward position. As illustrated, the spring element may be in the form of a sheet spring, but other types of spring elements may used, for example, helical springs, plate springs, or ring-shaped plate springs, which also urge the movable valve member 4 against the second movable valve member 5, or against the drive plate 14. The use of a second (cooperating) movable valve member 5 has the advantage that when the valve is closed not only is the upper valve opening 2 closed via the seal element 8 but the lower valve opening is also closed via the valve member 5.

In the embodiments shown, the drive means and its associated components are not illustrated because the features of the drive means are not material to the present invention. It is merely specified that forces are applied to the drive plate 14 in the direction of arrow 22 and in the opposite direction in a known manner.

FIGS. 8A-8F illustrate in more detail the course of the movement of the two cooperatively (and oppositely) moved slots 6 and 23. It is seen from FIG. 8A that in the rest position an accommodation opening 32 is formed by the mutually complementary cooperating slots 6, 23. This overlap region was described above as being formed from the adjacent end regions 29, 30 of the respective slots 6, 23.

As soon as a translational displacement force is applied to control slot 23 in the direction of arrow 22 (FIG. 3), slot 23 is moved rightward, until wheel 9 (FIGS. 1-3) passes through the curved region 12 of the guideway slot 3 and into region 11, whereby movable valve member 4 is raised in the direction of arrow 33. Meanwhile, slot 6 stays unmoved, because the movable valve member 4 can only move upward, in the direction of arrow 33, while roll body 16 also moves upward in the region of slot 6 and downward in the region of control slot 23.

This is illustrated in the in FIGS. 8B and 8C. Control slot 23 has been moved rightward through distance 22' (which may be, for example, about 6 mm), during a period when slot 6 has not been moved in the horizontal direction. However, slot 6 has been moved vertically upward by the distance 33'. In the rest position (FIG. 8A) and in the final position (FIG. 8F), the accommodation opening 32 takes on a circular shape for accommodating roll body 16 or 17.

In the intermediate positions, the accommodation opening expands to an ovaloid shape. In the final position (FIG. 8F), control slot 23 has been moved completely rightward, again while slot 6 has remained unmoved in the horizontal direction. This process describes the maximum possible vertical or upward excursion of the roll body in the direction of arrow 33 as the roll body is accommodated under the constraints of the accommodation opening.

In the final position, movable valve member 4 has thus undergone its maximum possible upward lifting movement to come to press against the sealing seat, in that roll body 16 is now at the end of the support surface 34 of slot 6. The progression of views of the movement in FIGS. 8A-8F also shows clearly how the reverse progression, that is, movement of the control slot leftward from the FIG. 8F position, leads to movement of the movable valve member 4, 5 away from the respective sealing seat. Because the roll bodies are constantly surrounded on all sides in accommodation opening 32, and are guided by configurational engagement, this movement away from the sealing seat is a continuously forced movement which occurs without play (as was the case with the upward movement in the direction of arrow 33).

For the sake of easy comprehensibility, in the exemplary embodiment according to FIGS. 5 and 6, slot 6 in cooperating movable valve member 5 is shown as a slot 7 which has the same function as slot 6 in movable valve member 4. In this exemplary embodiment, when movable valve member 4 is moved toward the sealing seat of valve opening 2, gap 27 is formed between movable valve member 4 and cooperating movable valve member 5.

The return to the rest position illustrated in FIG. 5 occurs in the reverse sequence, with the aid of the spring element 20. The spring element serves only to compensate for the necessary play.

The exemplary embodiment according to FIGS. 5 and 6 shows that one does not need a slot having a part 11 which serves as a detent, but rather spring element 20 can serve as detent 21.

Roll bodies 16 and 17 are protected against falling out in their longitudinal directions by means of external detents 28 which are disposed on drive plate 14.

It is important that the interrelationships of the roll bodies and slots 6, 23 according to FIG. 8A (rest position) are preserved over the entire course of movement, and that drive plate 14, with its support rolls 9, is out of engagement with the part 11 of guideway slot 3 but is instead in the region of axis 10. During this longitudinal movement, roll bodies 16 and 17 are arranged stably in the rest position according to FIG. 8A.

The invention affords the advantage that the connection between drive plate 14 and movable valve member 4 (also cooperating movable valve member 5) is controlled via two cooperating control slots 6, 23 which have mutually complementary configurations, and via the supporting ends (gudgeon ends) of roll bodies 16 and 17, so as to achieve a guiding configurational engagement between drive plate 14 and movable valve member 4, 5. In this connection, it is advantageous that the slots are all closed laterally, that is, such that roll bodies 16 and 17 cannot exit from the slots, which represents an improvement over the state of the art.

Figure 9:
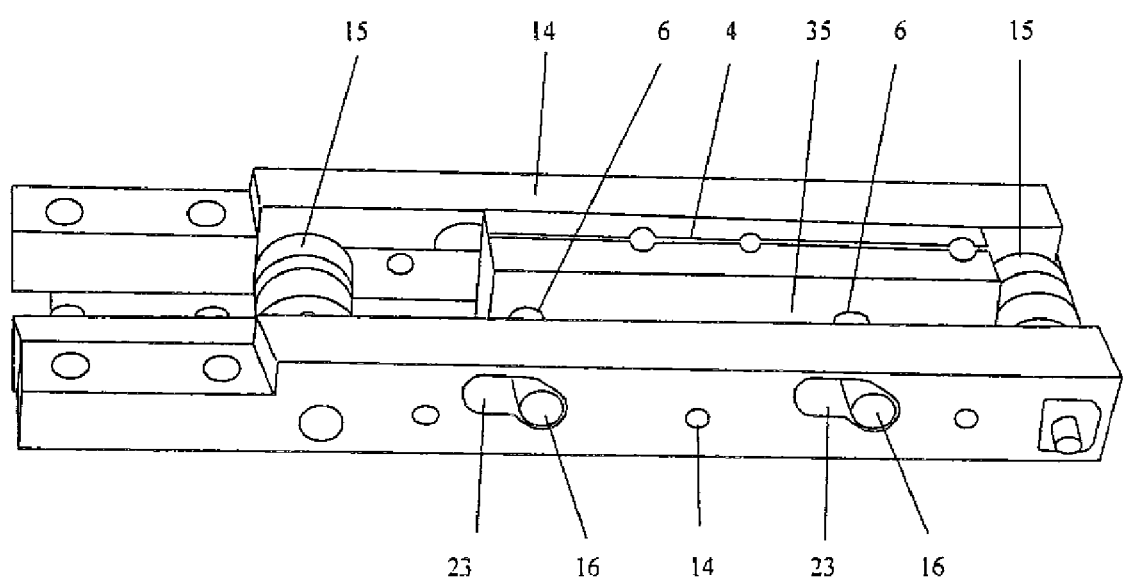
FIG. 9 is a perspective, expanded view of the disc with the roll bodies in accordance with the invention.

FIG. 9 is a perspective view of movable valve member 4 with roll bodies 16 which undergo rolling in slots 23 of drive plate 14.

For the sake of clarity, the two beam-like parallel parts of drive plate 14 have been moved farther apart, whereby movable valve member 4 disposed in the space between the parallel parts can be depicted more clearly. In an actual embodiment, parts 4 and 14 will be closer together and gap 35 will be much smaller.

Figure 10:
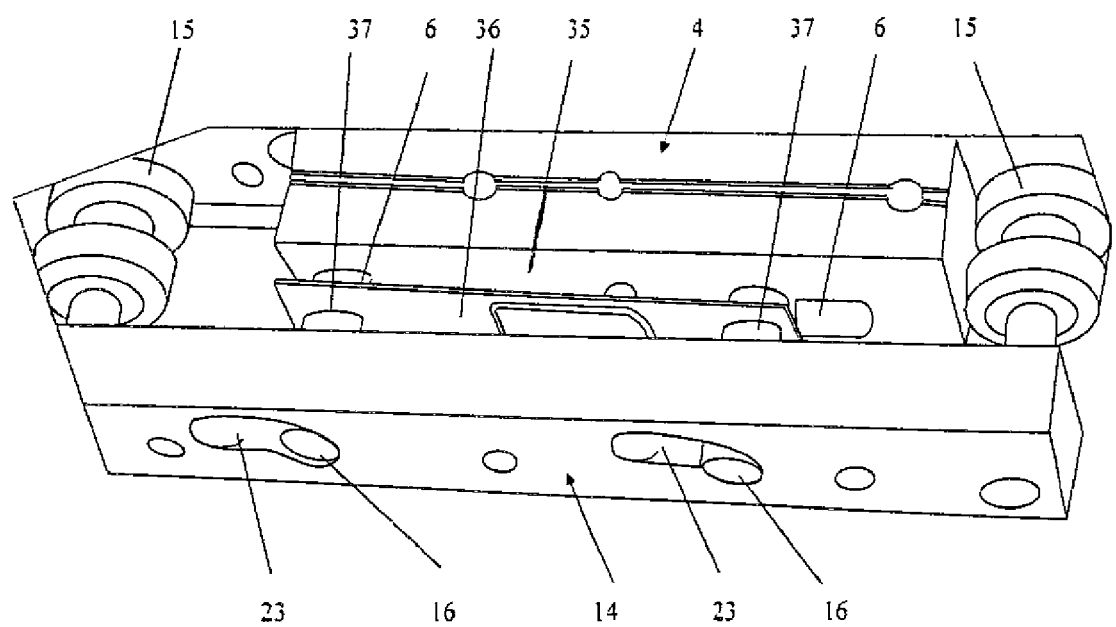
FIG. 10 is an enlarged view of a portion of FIG. 9.

FIG. 10 illustrates an enlarged detail of FIG. 9, wherewith synchronizing plate 36 has been added which has two bores 37 which are engaged by roll bodies 16 with a certain support play. The synchronization plate 36 serves to synchronize the movement of parallel roll bodies 16 disposed a mutual distance apart. If and when the position of the frontmost roll body (in the direction of travel) 16 in slots 6 and 23 is changed, rear roll body 16 is carried along, by the intermediary of the synchronization plate 36.

What is claimed is:

1. A valve mechanism for selectively sealing and unsealing a valve opening in a housing, the valve opening having a valve seat surface, the valve mechanism comprising:
   at least one valve member movable in said housing in directions parallel to and perpendicular to said valve seat surface of the valve opening;
   a drive plate in said housing connected to said at least one valve member, said drive plate being configured for translational motion within said housing whereby the parallel motion of said at least one valve member is accomplished; and
   means for effecting the perpendicular motion comprising:
   control slots in said drive plate;
   complementary slots in said at least one valve member, said
   complementary slots cooperate with and at least partially overlap the respective control slots; and
   a plurality of unattached roll bodies mounted in said at least one valve member, each said roll body extending into a control slot and a complementary slot;
   whereby cooperative motion between said roll bodies and the control slots and complementary slots results in selective opening and closing of the valve opening.

2. The valve mechanism according to claim 1, wherein the roll bodies are freely guided and do not have axles.

3. The valve mechanism according to claim 1, wherein the slots are closed.

4. The valve mechanism according to claim 2, wherein the slots are closed.

5. The valve mechanism according to claim 1, wherein:
   each control slot in said drive plate has an end region which forms one side of an accommodation opening, and the end region of the respective complementary slot in said valve member forms the other side of the accommodation opening; and
   wherein said respective roll body is held in the accommodation opening with insubstantial play.

6. The valve mechanism according to claim 2, wherein:
   each control slot in said drive plate has an end region which forms one side of an accommodation opening, and the end region of the respective complementary slot in said valve member forms the other side of the accommodation opening; and
   wherein said respective roll body is held in the accommodation opening with insubstantial play.

7. The valve mechanism according to claim 3, wherein:
   each control slot in said drive plate has an end region which forms one side of an accommodation opening, and the end region of the respective complementary slot in said valve member forms the other side of the accommodation opening; and
   wherein said respective roll body is held in the accommodation opening with insubstantial play.

8. The valve mechanism according to claim 1, wherein the shape of the control slots in said drive plate is substantially the same as the shape of the complementary slots in said at least one valve member, and the control slots are disposed at a 180° orientation with respect to the complementary slots in said valve member, to provide complementary slot shaping.

9. The valve mechanism according to claim 2, wherein the shape of the control slots in said drive plate is substantially the same as the shape of the complementary slots in said at least one valve member, and the control slots are disposed at a 180° orientation with respect to the complementary slots in said valve member, to provide complementary slot shaping.

10. The valve mechanism according to claim 3, wherein the shape of the control slots in said drive plate is substantially the same as the shape of the complementary slots in said at least one valve member, and the control slots are disposed at a 180° orientation with respect to the complementary slots in said valve member, to provide complementary slot shaping.

11. The valve mechanism according to claim 5, wherein the shape of the control slots in said drive plate is substantially the same as the shape of the complementary slots in said at least one valve member, and the control slots are disposed at a 180° orientation with respect to the complementary slots in said valve member, to provide complementary slot shaping.

12. The valve mechanism according to claim 1, wherein the roll bodies are provided with at least one groove, which groove each accommodates an O-ring, said O-ring being slightly compressed on only one side.

13. The valve mechanism according to claim 1, and further comprising a spring element which is slightly pre-stressed and presses said roll bodies against the corresponding surfaces in the slots.

14. The valve mechanism according to claim 13, wherein said spring element forms a forward detent means for said drive plate.

15. The valve mechanism according to claim 1, wherein said housing is formed with a first valve opening and a second valve opening aligned with the first valve opening, said at least one valve member comprising:
   a first valve member configured to selectively open and close the first valve opening; and
   a second valve member configured to selectively open and close the second valve opening.

16. The valve mechanism according to claim 5, wherein said housing is formed with a first valve opening and a second valve opening aligned with the first valve opening, said at least one valve member comprising:
   a first valve member configured to selectively open and close the first valve opening; and
   a second valve member configured to selectively open and close the second valve opening.

17. The valve mechanism according to claim 8, wherein said housing is formed with a first valve opening and a second valve opening aligned with the first valve opening, said at least one valve member comprising:
   a first valve member configured to selectively open and close the first valve opening; and
   a second valve member configured to selectively open and close the second valve opening.

18. The valve mechanic sin according to claim 1, wherein said roll bodies are secured against falling out in their longitudinal directions by means of detents which are disposed externally on said drive plate.

19. The valve mechanism according to claim 2, wherein said roll bodies are secured against falling out in their longitudinal directions by means of detents which are disposed externally on said drive plate.

20. The valve mechanism according to claim 1, and further comprising means to synchronize the movement of said roll bodies.

* * * * *